US010701598B2

(12) United States Patent
Tambaram Kailasam et al.

(10) Patent No.: US 10,701,598 B2
(45) Date of Patent: Jun. 30, 2020

(54) TECHNIQUES FOR HANDOVER CELL SELECTION PROCEDURES IN POOR RADIO CONDITIONS

(71) Applicant: QUALCOMM Incorporated, San Diego, CA (US)

(72) Inventors: Sundaresan Tambaram Kailasam, San Diego, CA (US); Daniel Amerga, San Diego, CA (US); Kumarabhijeet Singh, San Diego, CA (US); Yongsheng Shi, San Diego, CA (US); Aziz Gholmieh, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 16/058,774

(22) Filed: Aug. 8, 2018

(65) Prior Publication Data
US 2019/0053109 A1    Feb. 14, 2019

Related U.S. Application Data

(60) Provisional application No. 62/543,860, filed on Aug. 10, 2017.

(51) Int. Cl.
*H04W 36/00* (2009.01)
*H04W 24/10* (2009.01)
*H04W 56/00* (2009.01)
*H04W 36/30* (2009.01)

(52) U.S. Cl.
CPC ....... *H04W 36/0058* (2018.08); *H04W 24/10* (2013.01); *H04W 56/0035* (2013.01); *H04W 36/0061* (2013.01); *H04W 36/305* (2018.08)

(58) Field of Classification Search
CPC ......... H04W 36/0058; H04W 56/0035; H04W 24/10; H04W 36/305; H04W 36/0061
See application file for complete search history.

(56) References Cited

U.S. PATENT DOCUMENTS

| 2013/0079007 | A1* | 3/2013 | Nagaraja | H04W 36/0005 455/436 |
| 2014/0087729 | A1* | 3/2014 | Olofsson | H04W 36/0083 455/436 |
| 2014/0219119 | A1* | 8/2014 | Ishida | H04W 24/10 370/252 |
| 2014/0348010 | A1* | 11/2014 | Kanamarlapudi | H04L 43/0847 370/252 |
| 2016/0112923 | A1* | 4/2016 | Yang | H04W 36/0088 455/436 |
| 2018/0279140 | A1* | 9/2018 | Chandrane | H04W 24/04 |

* cited by examiner

*Primary Examiner* — Walli Z Butt
(74) *Attorney, Agent, or Firm* — Linda G. Gunderson; Arent Fox LLP

(57) ABSTRACT

A system and method of performing a handover include detecting an out of sync event while being connected to a current cell, determining whether a measurement report time-to-trigger signal is active, sending, in response to the detection of the out of sync even and the measurement report time-to-trigger signal being active, a first new measurement report and a first special cause flag prior to a next scheduled measurement report to the communication network, receiving a first list of one or more neighboring cells suitable for a handover, identifying a first neighboring cell from the first list for the handover, and attempting to perform the handover from the current cell to the first neighboring cell.

30 Claims, 11 Drawing Sheets

TECHNIQUES FOR HANDOVER CELL SELECTION PROCEDURES IN POOR RADIO CONDITIONS

CROSS-REFERENCE TO RELATED APPLICATION

This application claims the benefit of U.S. Provisional Application Ser. No. 62/543,860, entitled "Techniques for Handover Cell Selection Procedures in Poor Radio Conditions" and filed on Aug. 10, 2017, the content of which is expressly incorporated in its entirety.

BACKGROUND

Aspects of the present disclosure relate generally to wireless communication networks, and more particularly, to cell selection by an user equipment.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

Any user equipment (UE) may be configured to maintain the connection to the best possible cell to achieve faster throughputs and better coverage. Sometimes when a UE encounters an out of sync or a radio link failure (RLF) event, there is a significant loss to the downlink and uplink data transmissions. Especially in millimeter wave (mmW)/5G technology, where the radio conditions can change rapidly, RLF/out of sync scenario is expected to be seen more frequently once deployed. In Non-Standalone (NSA) cases as well, if a UE in LTE experiences a RLF event, this will have a double loss since both the LTE and NR connection will have to be torn down. UEs not having any robust mechanism to recover faster will suffer a unacceptable loss in the data throughputs and also might delay camping on the best cell.

In NR communications, connections between the UE and the base station (BS) may be lost due to a variety of technological and environmental factors, such as out of sync and RLF events. For example, in millimeter wave 5G technology, the radio conditions can change rapidly, which may cause RLF and/or out of sync incidents. In Non-Standalone 5G cases, since the UE anchors the connection on existing LTE infrastructure, a lost connection may cause network delays because the UE may reconnect to both LTE and NR. Lost connections may lead to interruptions in the network access of the UE, dropped phone calls, loss in data throughputs, and in general, lower overall user satisfaction. Therefore, improvements may be desired to handle these situations.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. The purpose is to present some concepts of one or more aspects in a simplified form as a prelude to the more detailed description that is presented later.

Features of the present disclosure may improve UE performance because of higher downlink (DL) and uplink (UL) throughputs due to efficient handover procedures and transitioning from a bad cell sooner, higher DL and UL throughputs due to faster connection re-establishment (in case a handover (HO) didn't occur), reduced call drops by handing over at the right time, higher re-establishment success rates, a way to indicate panic mode to the network (NW) for efficient UE handling, and efficient utilization of mmW technology or poor radio conditions. Further, features of the present disclosure may improve network performance due to the ability to service more UEs in connected state, get the panic mode/out of sync/RLF information sooner from the UE and prepare the target cells with UE context (for faster and successful HO), and be able to prioritize UEs in panic mode from UEs in non-panic mode via the introduction of "special cause" flag.

Aspects of the present disclosure includes detecting an out of sync event while being connected to a current cell, determining whether a measurement report time-to-trigger signal is active, sending, in response to the detection of the out of sync event and the measurement report time-to-trigger signal being active, a first new measurement report and a first special cause flag prior to a next scheduled measurement report to the communication network, receiving a first list of one or more neighboring cells suitable for a handover, identifying a first neighboring cell from the first list for the handover, and attempting to perform the handover from the current cell to the first neighboring cell.

Moreover, the present disclosure also includes apparatus having components or configured to execute the above-described methods, and computer-readable medium storing one or more codes executable by a processor to perform the above-described methods.

For example, another aspect of the present disclosure includes an apparatus having a transceiver, a memory, and one or more processors configured to perform the steps of detecting an out of sync event while being connected to a current cell, determining whether a measurement report time-to-trigger signal is active, sending, in response to the detection of the out of sync event and the measurement report time-to-trigger signal being active, a first new measurement report and a first special cause flag prior to a next scheduled measurement report to the communication network, receiving a first list of one or more neighboring cells suitable for a handover, identifying a first neighboring cell from the first list for the handover, and attempting to perform the handover from the current cell to the first neighboring cell.

Other aspects of the present disclosure include a computer-readable medium having codes that, when executed by one or more processors, cause the one or more processors to perform the steps of detecting an out of sync event while being connected to a current cell, determining whether a measurement report time-to-trigger signal is active, sending, in response to the detection of the out of sync event and the measurement report time-to-trigger signal being active, a first new measurement report and a first special cause flag prior to a next scheduled measurement report to the communication network, receiving a first list of one or more neighboring cells suitable for a handover, identifying a first neighboring cell from the first list for the handover, and attempting to perform the handover from the current cell to the first neighboring cell.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
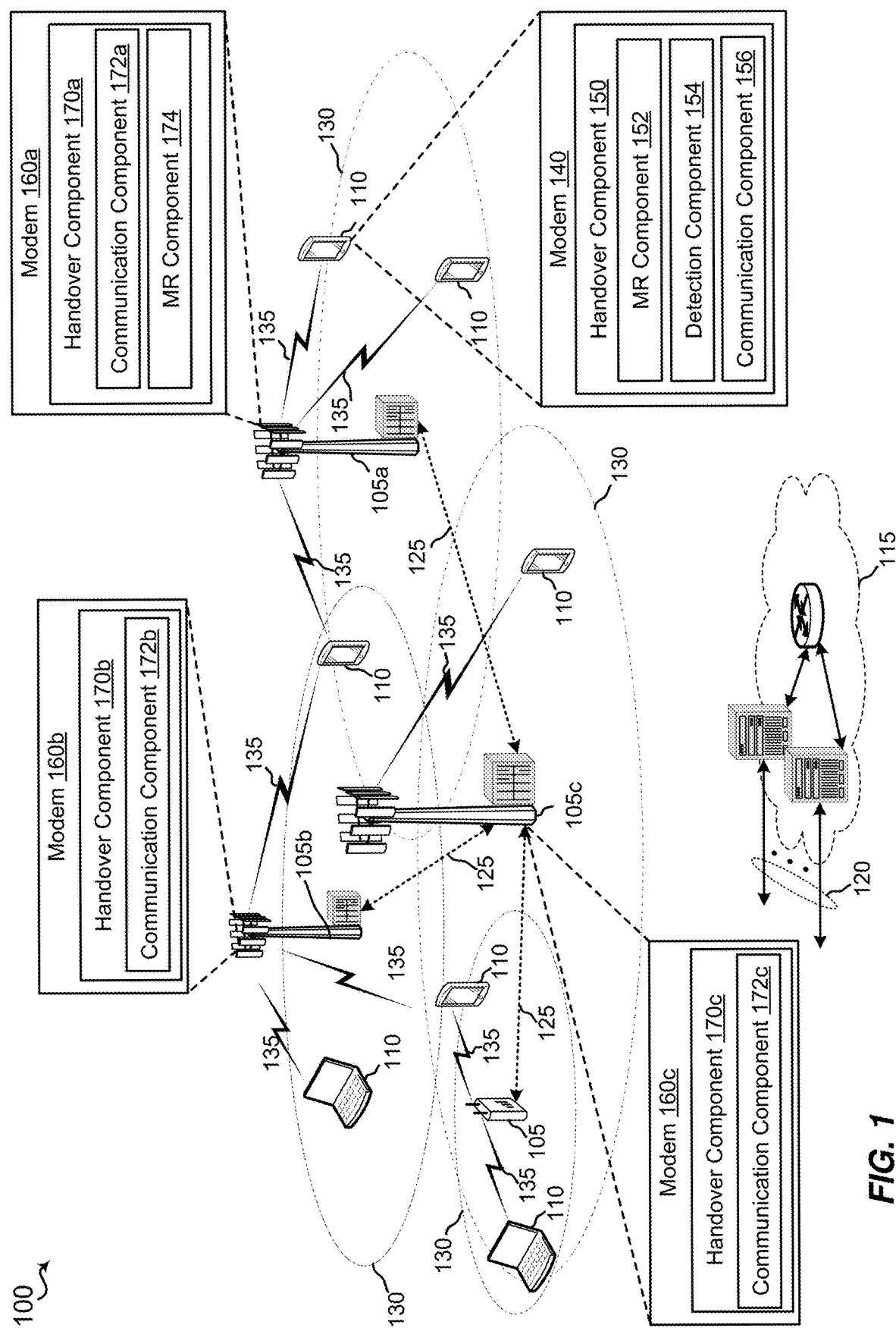
FIG. 1 is a schematic diagram of an example of a wireless communication network including at least one user equipment (UE)

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

The features described in the present application detail a mechanism to provide better and faster connectivity (compared to conventional methods) in two cases. First, the features include faster measurement reporting and successful HO when a UE experiences an out of sync event. The measurement reports provide the target cell relevant information relating to the UE so that the HO is successful. A "special cause" flag indicating a RLF event or an out of sync event in measurement report can signal the network to prioritize the UE to do HO sooner (before encountering the RLF event). Second, the features provide cell selection to the best cell after UE experiences a RLF event. With the measurement reporting, best cells information is maintained from connected mode so that cell selection and re-establishment happens as soon as the UE experiences a RLF event. This may reduce re-establishment failures. The features are not restricted to mmW or 5G, and can be implemented for any radio access technology.

Referring to FIG. 1, in accordance with various aspects of the present disclosure, a wireless communication network 100 includes at least one UE 110 with a modem 140 having a handover component 150 that manages the handover of the UE 110 from one cell to another. Further, the wireless communication network 100 includes base stations 105a-c each with a modem 160a-c having a handover component 170a-c that manages the handover of the UE 110.

The modems 160a-c may be configured to communicate with other base stations 105 and UEs 110 via a cellular network or other wireless and wired networks. The modem 140 may be configured to communicate via a cellular network, a Wi-Fi network, or other wireless and wired networks. The modems 140, 160a-c may receive and transmit data packets. The base station 105a may be similar to different than the base stations 105b-c. The base stations 105b-c also may be same or different components as the base station 105a.

In some implementations, the handover component 170a-c of the base station 105a-c each includes a communication component 172a-c, which handles communications with the base stations 105a-c and the UEs 110, and the base station 105a includes a measurement report (MR) component 174 that receives and analyzes the measurement reports sent by the UE 110.

In some implementations, the handover component 150 of the UE 110 includes a measurement report (MR) component 152 and a detection component 154. The measurement report component 152 generates measure reports and a special cause flag associated with status of a communication link 135. The detection component 154 detects out of sync (OOS) and RLF associated with the communication link 135.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., Si, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, the base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

A UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

In one aspect, a UE 110 of the ones shown in FIG. 1 may be configure to detect an out of sync event while being connected to a current cell, determine whether a measurement report time-to-trigger signal is active, send, in response to the detection of the out of sync even and the measurement report time-to-trigger signal being active, a first new measurement report and a first special cause flag prior to a next scheduled measurement report to the communication network, receiving a first list of one or more neighboring cells suitable for a handover, identifying a first neighboring cell from the first list for the handover, and attempting to perform the handover from the current cell to the first neighboring cell. Additional details of these operations will be described below.

Figure 2:
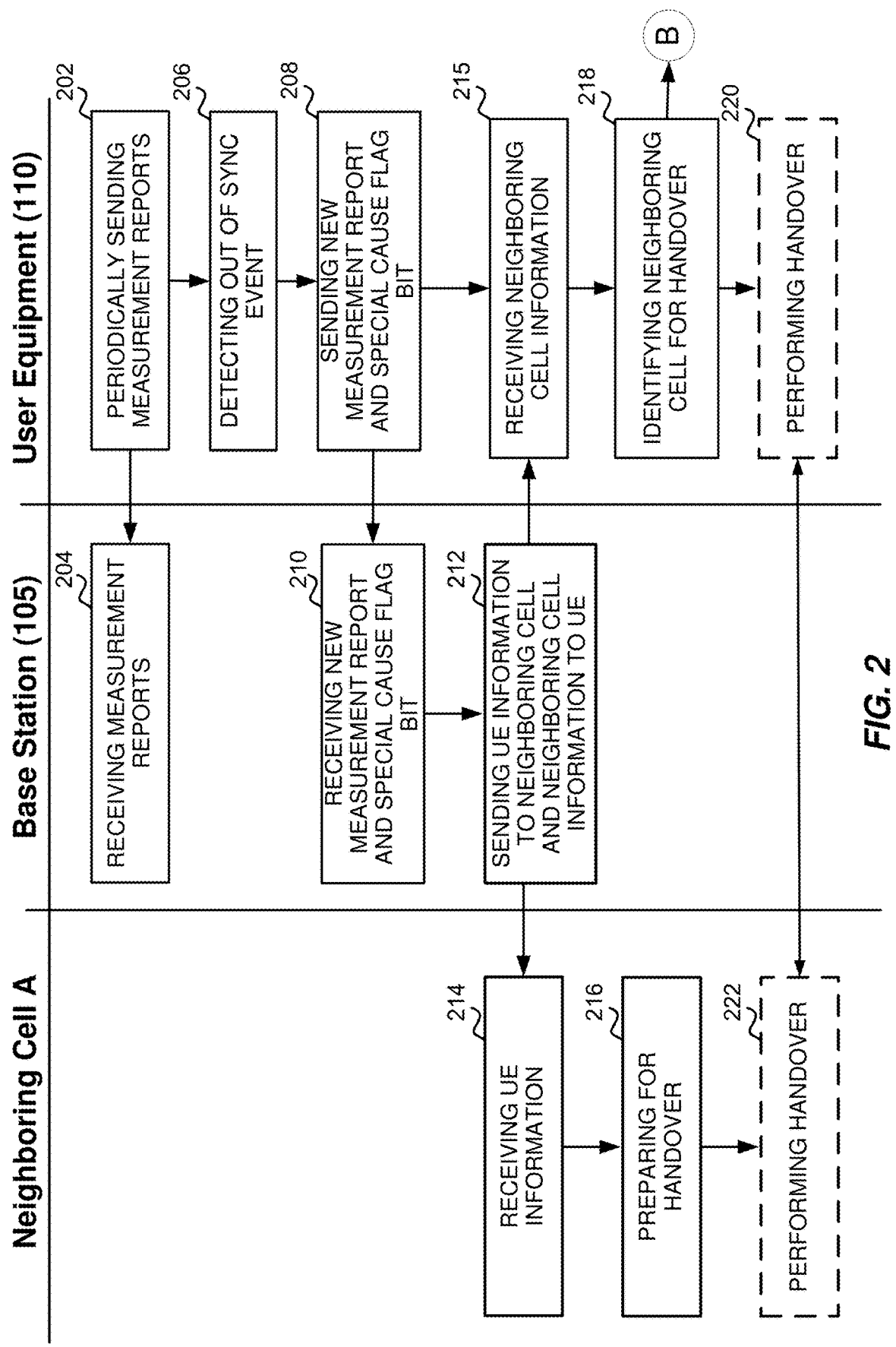
FIG. 2 is an example of a handover method performed by a base station.

Turning to FIG. 2, in some implementations, the UE 110 may periodically send (202) measurement reports to a base station such as the base station 105a. In a non-limiting example, the MR component 152 of the UE 110 may send (202) measurement reports at an interval of 100 milliseconds, 200 milliseconds, 500 milliseconds, 1 second, 2 seconds, 5 seconds, 10 seconds, 30 seconds, or 60 seconds. The measurement reports may contain intra-frequency measurements, inter-frequency measurements, and/or inter-RAT (radio access technology) measurements. In certain implementations, the measurement reports may be triggered by an event designated by the base station 105a. For example, the UE 110 may send a measurement report when 1) the base station 105a performs better (e.g., faster data throughput, more reliable data transmissions, less dropped packets) than a pre-defined threshold, 2) the base station 105a performs worse than a pre-defined threshold, 3) a neighboring cell (another base station 105 or another coverage area 130) outperforms the base station 105 by a predetermined offset, 4) a neighboring cell performs better than a pre-defined threshold, and/or 5) an inter-RAT neighbor performs better than a pre-defined threshold.

Next, the base station 105a may receive (204) the measurement reports from the UE 110. For example, the MR component 174 may receive (204) the periodic measurement reports from the UE 110.

During operation, in certain aspects, the UE 110 may detect (206) an out of sync event in the communication link 135. In a non-limiting example, the detection component 154 may detect (206) an out of sync event when the UE 110 is unable to decode information in the physical downlink control channel (PDCCH) due to a decrease in reference signal strength. In another example, the out of sync event may be detected when the UE 110 is unable to decode the received information due to high noise spectra and/or low data throughput. Other conditions may also trigger an out of sync event.

In certain implementations, after the detection of the out of sync event, the UE 110 may send (208) a new measurement report with a special cause flag to the base station 105a after a predetermined threshold time. The predetermined threshold time may be a fraction of the n310 counter. The n310 counter may be a counter that begins to count down when the UE 110 encounters the out of sync event and/or a RLF event. For example, the MR component 152 may send the new measurement report with the special cause flag to the base station 105a after 10% of the n310 counter. The special cause flag may include one or more bits that indicate to the base station 105a that the UE 110 experiences out of sync events. In some implementations, the special cause flag may include one or more bits indicating an impending RLF event. In cases where the UE 110 is sending (202) periodic measurement reports to the base station 105a, the UE 110 may send (208) the new measurement report prior to the next periodic measurement report. For example, if the UE sends (202) measurement reports every 1 second, and the out of sync event occurs 100 milliseconds after the transmission of the last periodic measurement report, the UE may determine to send (208) the new report with the special cause flag to the base station 105a immediately after expiration of the predetermined threshold time (e.g. 100 milliseconds), such as 200 milliseconds after the last periodic measurement report. The UE may also send (208) the new report any time before a next periodic measurement report. The sending of the new measurement report may provide an early warning to the base station 105a regarding the out of sync event and/or an impending radio failure link event. The special cause flag may also indicate low serving cell power, fast drop in serving cell power, low UL grant, or low channel quality indicator.

Next, in some implementations, the base station 105a may receive (210) the new measurement report with the special cause flag. As a non-limiting example, the MR component 174 may receive (210) the new measurement report and the special cause flag from the UE 110. The base station 105a may receive (210) the new measurement report with the special cause flag in addition to the periodic measurement reports. The special cause flag may include one or more bits that indicate to the base station 105a that the UE 110 experiences out of sync events After the reception of the new measurement report, in certain aspects, the base station 105a may send (212) UE information to a neighboring cell and neighboring cell information to the UE 110. For example, the communication component 172 may send (212) the UE information to the neighboring cell A. As discussed above, the neighboring cell A may obtain information relating to the other base station 105b, a carrier or component carrier associated with the base station 105b, or another coverage area 130 (e.g., sector, etc.) of the carrier or the base station 105b. The UE information may include measurements and parameters used in the handover operation, such as offset, hysteresis, time-to-trigger parameters. Similarly, the communication component 172 may send (212) the neighboring cell information to the UE 110. The information may include a list of potential neighboring cells suitable for the handover.

In certain aspects, the UE 110 may receive (215) the neighboring cell information from the base station 105a. For example, the communication component 156 may receive (213) the neighboring cell information that includes the list of potential neighboring cells suitable for the handover operation. The list may rank the neighboring cells based on suitability.

In some implementations, the neighboring cell A may receive (214) the UE information from the base station 105a. For example, the communication component 172b of the base station 105b or coverage area 130 may receive (214) the UE information from the base station 105a. The UE information may assist the neighboring cell to prepare for the handover operation of the UE 110 from the base station 105a to the base station 105b.

Next, in some aspects, the neighboring cell A prepares (216) for the handover of the UE 110. In a non-limiting example, the handover component 170b may prepare (216) for the handover of the UE 110.

In certain implementations, after sending the new measurement report, the UE 110 may identify (218) the neighboring cell A for handover. For example, the handover component 150 may identify (218) the base station 105b for the handover operation. The UE 110 may determine that the reference signal received power (RSRP) sent by the base station 105b is higher than the RSRP of the base station 105a. After the identification (218), the operation can proceed to block 402 for further processing (see e.g. FIG. 4).

Next, in an aspect, the UE 110 and the neighboring cell A may optionally perform (220, 222) the handover operation. For example, the handover components 150, 170b may perform (220, 222) the handover operation. The handover operation may be accelerated because the base station 105b obtained the UE information earlier compared to preparing and performing the handover operation after an RLF event.

Figure 3:
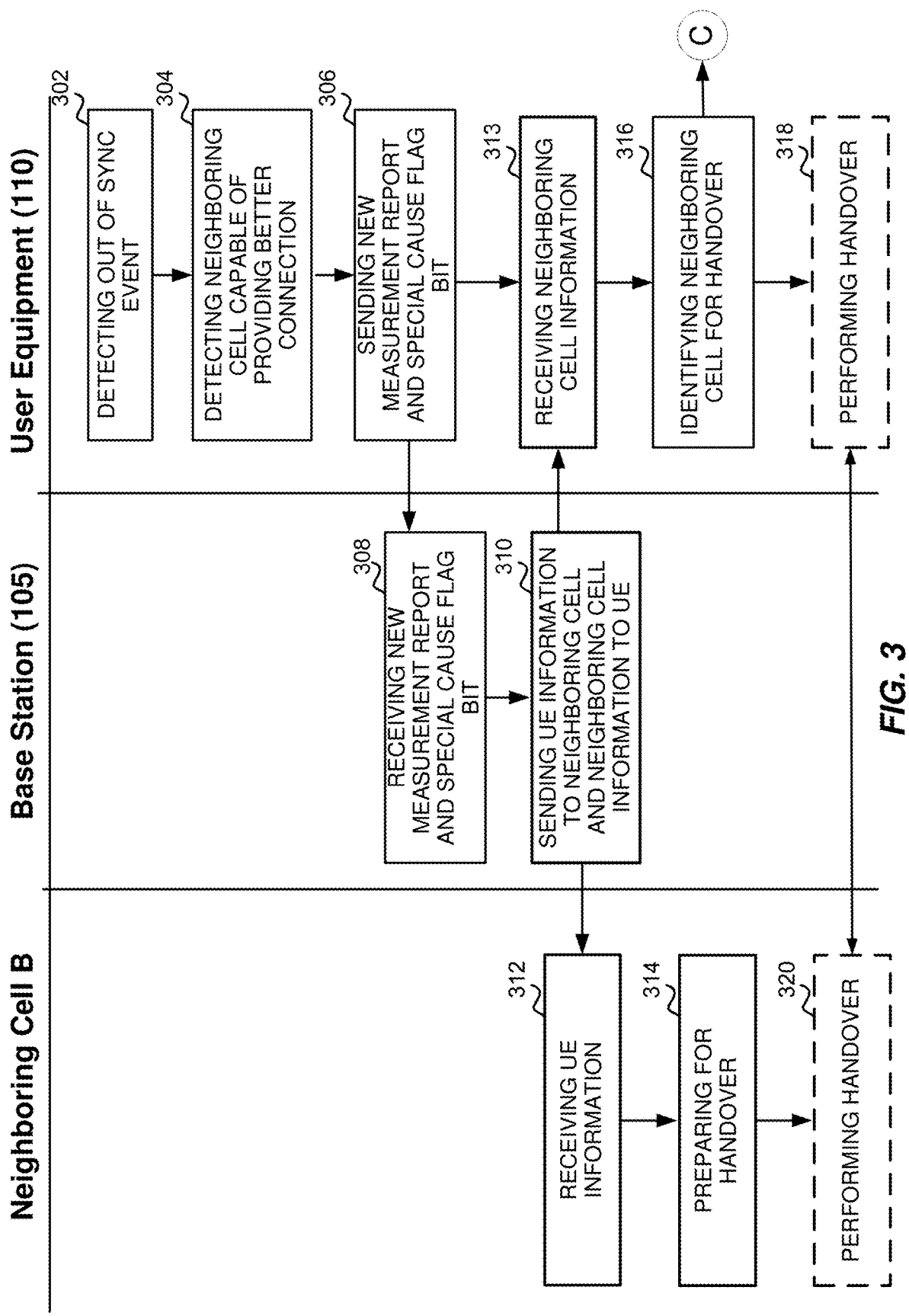
FIG. 3 is another example of a handover method based on a UE detecting a neighboring cell capable of providing improved connection than the currently connected base station.

Referring now to FIG. 3, in some implementations, the UE 110 may detect (302) an out of sync event in the communication link 135. In a non-limiting example, the detection component 154 may detect (302) an out of sync event associated with the UE 110 and the base station 105a.

Next, in certain aspects, the UE 110 may identify (304) a neighboring cell B capable of providing a better connection. For example, the UE 110 may identify (304) the base station 105c as being capable of providing a better connection.

In certain implementations, after the detection function, the UE 110 may send (306) the new measurement report with a special cause flag to the base station 105a. For example, the MR component 152 may send (306) the new measurement report with the special cause flag to the base station 105a when there is no periodic measurement report transmission. The special cause flag may indicate to the base station 105a that the UE 110 has encountered the out of sync event and the transmitted measurement report may include information used by the base station 105a to determine candidates for the handover operation.

Next, in some implementations, the base station 105a may receive (308) the new measurement report with the special cause flag. As a non-limiting example, the MR component 174 may receive (308) the new measurement report and the special cause flag from the UE 110.

After the reception of the new measurement report, in certain aspects, the base station 105a may send (310) UE information to the neighboring cell B. For example, the communication component 172 may send (310) the UE information to the neighboring cell B. The information sent to the neighboring cell B may provide useful information to the neighboring cell B to prepare for the handover operation. As discussed above, the neighboring cell B may describe the other base station 105c, a carrier or component carrier associated with the other base station 105c, or another coverage area 130 (e.g., sector, etc.) of the carrier or the other base station 105c. The UE information may include measurements and parameters used in the handover operation from the base station 105a to the base station 105c, such as offset, hysteresis, time-to-trigger parameters.

In some implementations, the neighboring cell B may receive (312) the UE information from the base station 105a. For example, the communication component 172c of the base station 105c or coverage area 130 may receive (312) the UE information from the base station 105a. The UE information may assist the neighboring cell B to prepare for the handover operation of the UE 110 from the base station 105a.

In certain aspects, the UE 110 may receive (313) the neighboring cell information from the base station 105a. For example, the communication component 156 may receive (313) the neighboring cell information that includes the list of potential neighboring cells suitable for the handover operation. The list may include a ranking of the neighboring cells based on suitability.

Next, in some aspects, the neighboring cell b prepares (314) for the handover of the UE 110. In a non-limiting example, the handover component 190 may prepare (216) for the handover of the UE 110.

In certain implementations, after sending the new measurement report, the UE 110 may identify (316) the neighboring cell B for handover. For example, the handover component 150 may identify (316) the other base station 105c for the handover operation. After the identification (316), the operation can proceed to block 402 for further processing (see e.g. FIG. 4).

Next, in an aspect, the UE 110 and the neighboring cell B may optionally perform (318, 320) the handover operation. For example, the handover components 150, 170c may perform (318, 320) the handover operation.

Figure 4:
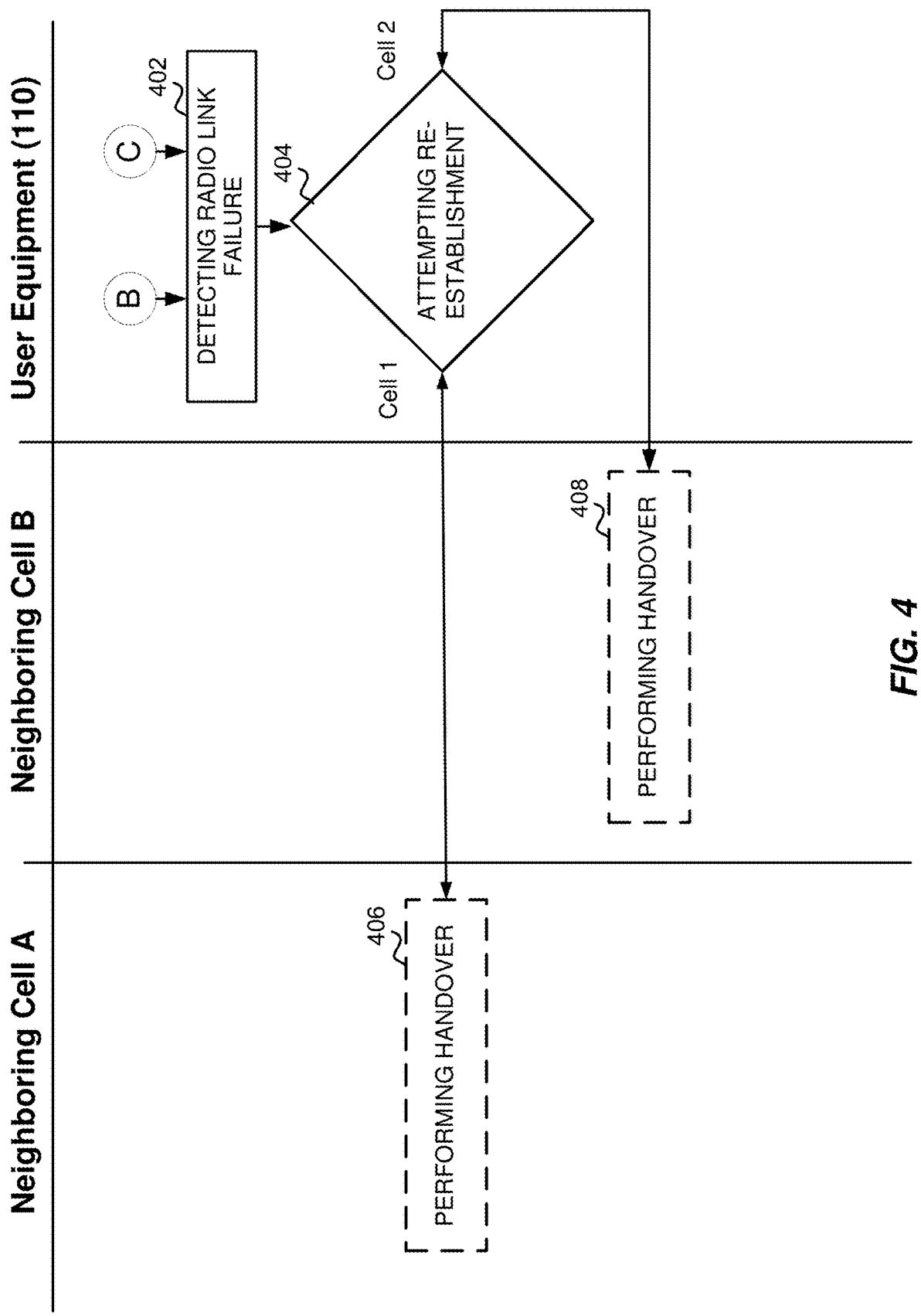
FIG. 4 is an example of a handover method after detecting a radio link failure.

Turning to FIG. 4, if the UE 110 does not perform the handover after identifying (218, 316) the neighboring cells A and B for handover, the UE 110 may detect (402) a radio link failure event. For example, the detection component 154 may detect (402) a radio link failure event such as low reference signal received power (RSRP), low reference signal received quality (RSRQ), failure to decode PDCCH, and failure to decode physical downlink shared channel (PDSCH).

Next, the UE 110 may attempt (404) to recover from the RLF event by performing a re-establishment with the neighboring cell A or the neighboring cell B. In some implementations, after the RLF event, the UE 110 may first attempt (404) to perform the re-establishment with the neighboring cell A. If successful, for example, the handover component 170b may perform (406) the handover of the UE 110 from the base station 105a to the base station 105b. If the neighboring cell A is unavailable, the UE 110 may next attempt (404) to perform the handover with the neighboring cell B. If successful, the handover component 170c may perform (408) the handover of the UE 110 from the base station 105a to the base station 105c. Given that the UE 110 sent (208, 306) the new measurement report earlier, the neighboring cells A, B may have been preparing for the handover prior to the detection of the RLF event. The transmission of the new measurement report may accelerate the handover process after the RLF event.

Figure 5:
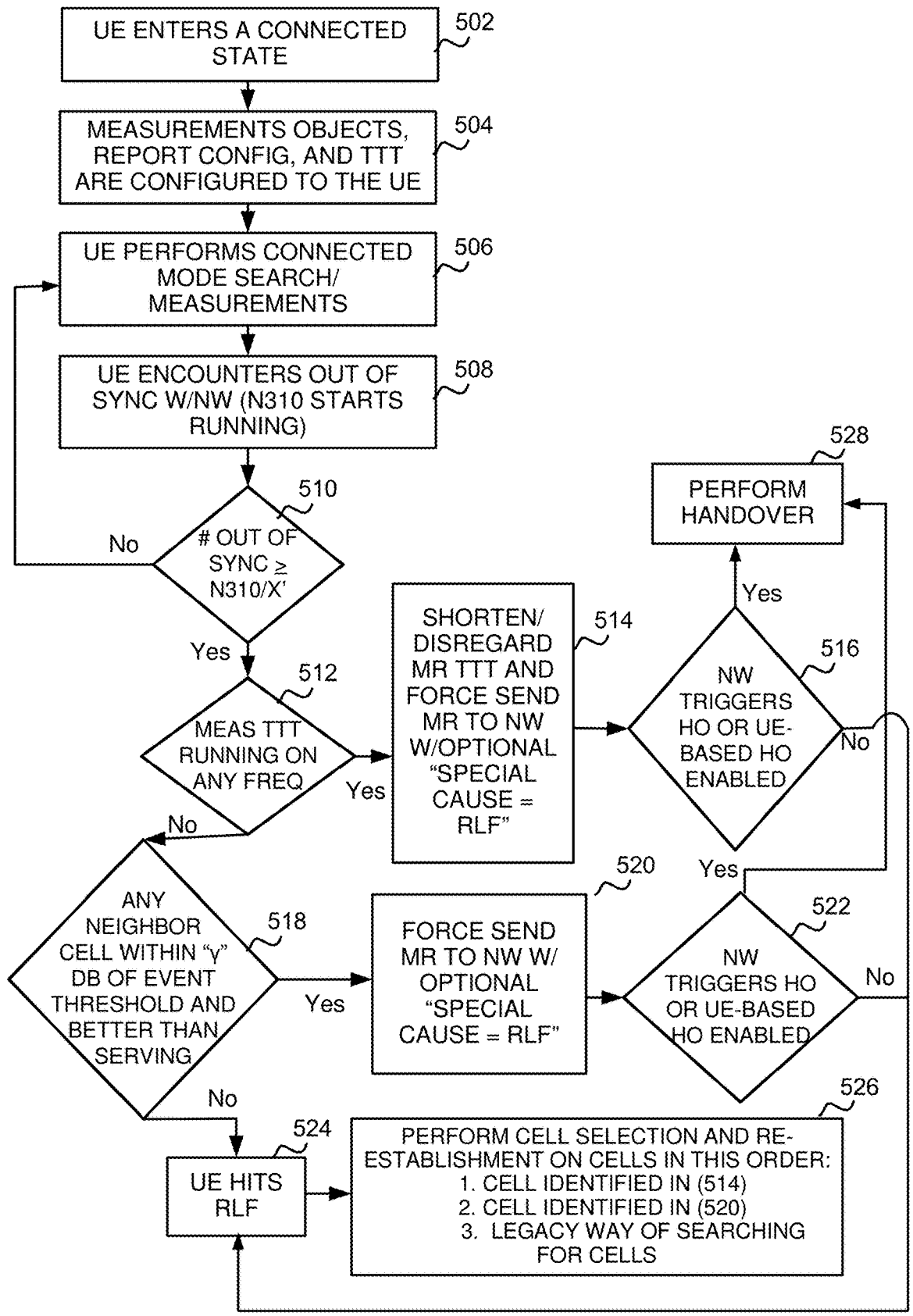
FIG. 5 is still another example of a handover method based on multiple cell selection lists.

Turning to FIG. 5, in certain implementations, the UE 110 may enter (502) a connected state. Next, measurements objects, report configurations, and time-to-trigger (TTT) are configured (504) to the UE 110. Subsequently, the UE 110 performs (506) connected mode search/measurements. Once the UE 110 encounters (508) an out of sync event within the network (NW) and the n310 counter starts running, the UE 110 may wait (510) until the duration of out of sync equals to or exceeds a factor of n310/X', where X' is an integer. If the UE 110 out of sync duration does not exceed the factor of n310/X', the UE 110 continues to perform (506) connected mode search/measurements. If the duration of out of sync equals to or exceeds the factor of n310/X', the UE 110 may determine (512) if there is a measurement report time-to-trigger signal running on any frequency. If yes, the UE 110 may shorten, or even disregard, the time-to-trigger signal for the measurement report (514) (i.e., sending the scheduled measurement report early or replace the scheduled measurement report with a new measurement report), and force send (i.e., sending outside of the scheduled transmission time) a new measurement report with an optional special cause flag indicating a potential RLF event. The special cause flag may be optional as the base stations 105 may be pre-configured to interpret an unscheduled measurement report sent by the UE 110 to indicate a potential RLF event. Next, if the network triggers the handover or if the UE-based handover is enabled (516), the network may perform (528) the handover.

If the UE 110 determines (512) that there is no MR time-to-trigger signal, the UE 110 may determine (518) if there is any neighbor cell within γ dB of event threshold and better than serving the UE 110, where γ may be an integer. If yes, the UE 110 may force send (520) a new measurement report with an optional special cause flag indicating a potential RLF. Next, if the network triggers the handover or if the UE-based handover is enabled, the network may perform (522) the handover.

If the UE 110 determines (518) that there is no neighbor cell within γ dB of event threshold and better than serving the UE 110, the UE 110 may encounter (524) a RLF event. After the RLF event, the UE 110 may perform cell selection and re-establishment on cells (526) in the following order:

cells identified during the function (514), cells identified during the function (520), and then legacy ways of searching for cells.

Figure 6:
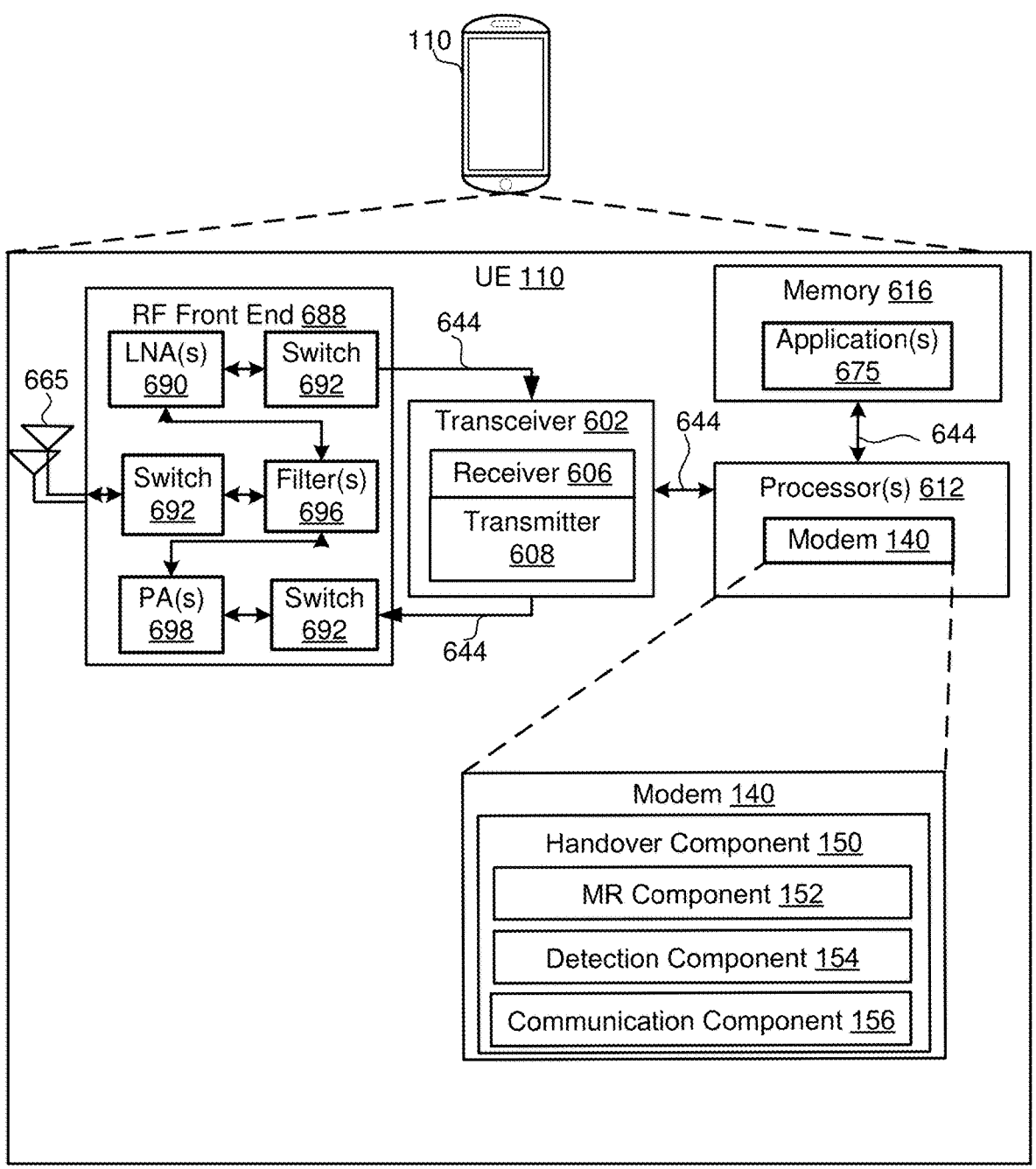
FIG. 6 is a schematic diagram of an example of a user equipment.

Referring to FIG. 6, one example of an implementation of the UE 110 may include a variety of components, some of which have already been described above, but including components such as one or more processors 612 and memory 616 and transceiver 602 in communication via one or more buses 644, which may operate in conjunction with modem 140 and the handover component 150 to enable one or more of the functions described herein related to the handover of the UE 110. Further, the one or more processors 612, modem 140, memory 616, transceiver 602, RF front end 688 and one or more antennas 665, may be configured to support voice and/or data calls (simultaneously or non-simultaneously) in one or more radio access technologies.

In an aspect, the one or more processors 612 can include a modem 140 that uses one or more modem processors. The various functions related to the handover component 150 may be included in modem 140 and/or processors 612 and, in an aspect, can be executed by a single processor, while in other aspects, different ones of the functions may be executed by a combination of two or more different processors. For example, in an aspect, the one or more processors 612 may include any one or any combination of a modem processor, or a baseband processor, or a digital signal processor, or a transmit processor, or a receiver processor, or a transceiver processor associated with transceiver 602. In other aspects, some of the features of the one or more processors 612 and/or modem 140 associated with the handover component 150 may be performed by transceiver 602.

Also, memory 616 may be configured to store data used herein and/or local versions of applications 675 or the handover component 150 and/or one or more of the subcomponents being executed by at least one processor 612. Memory 616 can include any type of computer-readable medium usable by a computer or at least one processor 612, such as random access memory (RAM), read only memory (ROM), tapes, magnetic discs, optical discs, volatile memory, non-volatile memory, and any combination thereof. In an aspect, for example, memory 616 may be a non-transitory computer-readable storage medium that stores one or more computer-executable codes defining the handover component 150 and/or one or more of the subcomponents, and/or data associated therewith, when UE 110 is operating at least one processor 612 to execute the handover component 150 and/or one or more of the subcomponents.

Transceiver 602 may include at least one receiver 606 and at least one transmitter 608. Receiver 606 may include hardware, firmware, and/or software code executable by a processor for receiving data, the code comprising instructions and being stored in a memory (e.g., computer-readable medium). Receiver 606 may be, for example, a radio frequency (RF) receiver. In an aspect, receiver 606 may receive signals transmitted by at least one base station 105. Additionally, receiver 606 may process such received signals, and also may obtain measurements of the signals, such as, but not limited to, Ec/Io, signal-to-noise ratio (SNR), RSRP, received signal strength indicator (RSSI), etc. Transmitter 608 may include hardware, firmware, and/or software code executable by a processor for transmitting data, the code comprising instructions and being stored in a memory (e.g., computer-readable medium). A suitable example of transmitter 608 may including, but is not limited to, an RF transmitter.

Moreover, in an aspect, UE 110 may include RF front end 688, which may operate in communication with one or more antennas 665 and transceiver 602 for receiving and transmitting radio transmissions, for example, wireless communications transmitted by at least one base station 105 or wireless transmissions transmitted by UE 110. RF front end 688 may be connected to one or more antennas 665 and can include one or more low-noise amplifiers (LNAs) 690, one or more switches 692, one or more power amplifiers (PAs) 698, and one or more filters 696 for transmitting and receiving RF signals.

In an aspect, LNA 690 can amplify a received signal at a desired output level. In an aspect, each LNA 690 may have a specified minimum and maximum gain values. In an aspect, RF front end 688 may use one or more switches 692 to select a particular LNA 690 and a specified gain value based on a desired gain value for a particular application.

Further, for example, one or more PA(s) 698 may be used by RF front end 688 to amplify a signal for an RF output at a desired output power level. In an aspect, each PA 698 may have specified minimum and maximum gain values. In an aspect, RF front end 688 may use one or more switches 692 to select a particular PA 698 and the specified gain value based on a desired gain value for a particular application.

Also, for example, one or more filters 696 can be used by RF front end 688 to filter a received signal to obtain an input RF signal. Similarly, in an aspect, for example, a respective filter 696 can be used to filter an output from a respective PA 698 to produce an output signal for transmission. In an aspect, each filter 696 can be connected to a specific LNA 690 and/or PA 698. In an aspect, RF front end 688 can use one or more switches 692 to select a transmit or receive path using a specified filter 696, LNA 690, and/or PA 698, based on a configuration as specified by transceiver 602 and/or processor 612.

As such, transceiver 602 may be configured to transmit and receive wireless signals through one or more antennas 665 via RF front end 688. In an aspect, transceiver may be tuned to operate at specified frequencies such that UE 110 can communicate with, for example, one or more base stations 105 or one or more cells associated with one or more base stations 105. In an aspect, for example, modem 140 can configure transceiver 602 to operate at a specified frequency and power level based on the UE configuration of the UE 110 and the communication protocol used by modem 140.

In an aspect, modem 140 can be a multiband-multimode modem, which can process digital data and communicate with transceiver 602 such that the digital data is sent and received using transceiver 602. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 688, transceiver 602) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 7:
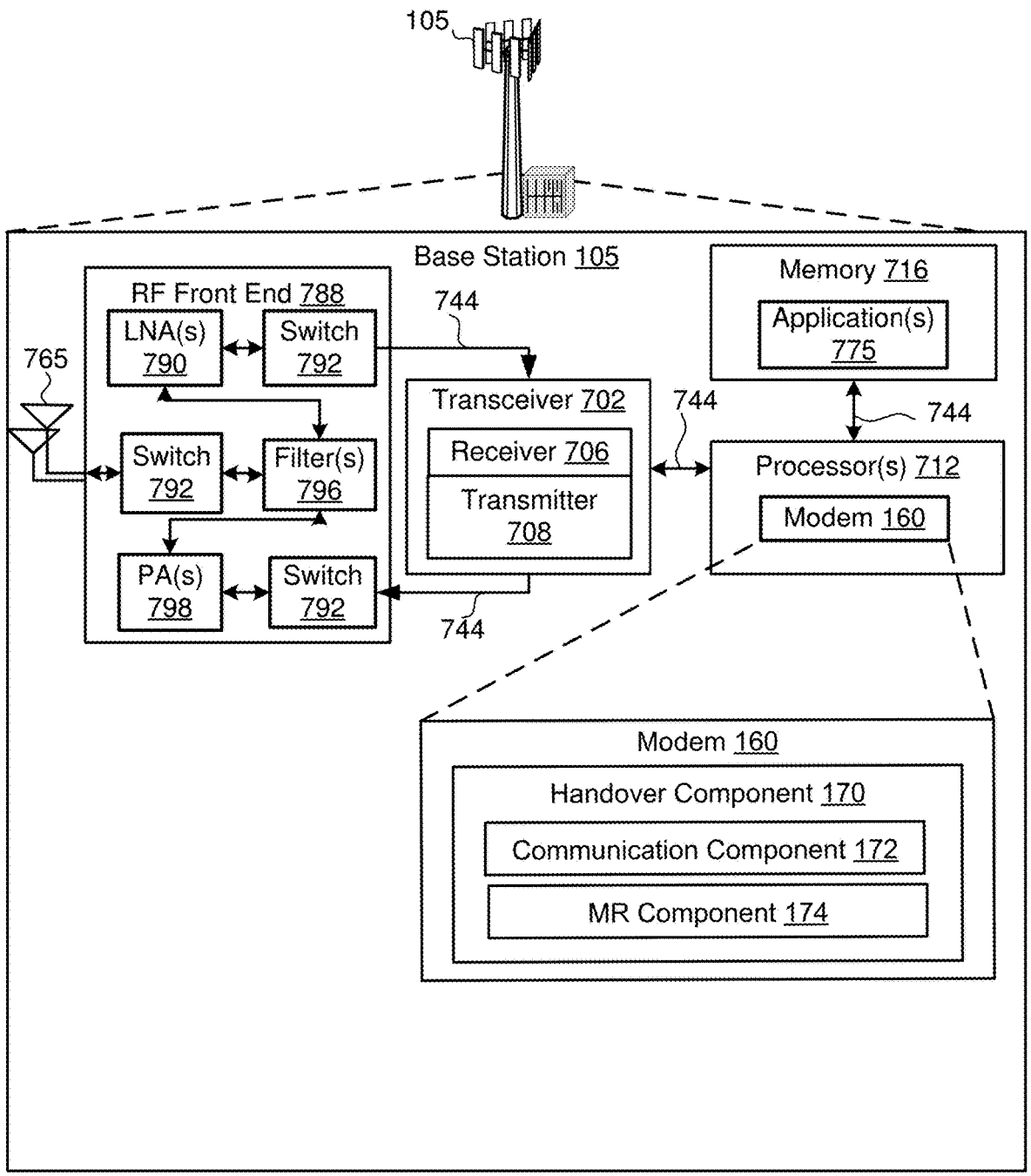
FIG. 7 is a schematic diagram of an example of a base station.

Referring to FIG. 7, one example of an implementation of the base station 105 may include a variety of components, some of which have already been described above, but including components such as one or more processors 712 and memory 716 and transceiver 702 in communication via one or more buses 744, which may operate in conjunction with modem 160 and the handover component 170 to enable one or more of the functions described herein related to the handover of the BS 105. Further, the one or more processors 712, modem 160, memory 716, transceiver 702, RF front end 788 and one or more antennas 765, may be configured to support voice and/or data calls (simultaneously or non-simultaneously) in one or more radio access technologies.

In an aspect, the one or more processors 712 can include a modem 160 that uses one or more modem processors. The various functions related to the handover component 170 may be included in modem 160 and/or processors 712 and, in an aspect, can be executed by a single processor, while in other aspects, different ones of the functions may be executed by a combination of two or more different processors. For example, in an aspect, the one or more processors 712 may include any one or any combination of a modem processor, or a baseband processor, or a digital signal processor, or a transmit processor, or a receiver processor, or a transceiver processor associated with transceiver 702. In other aspects, some of the features of the one or more processors 712 and/or modem 160 associated with the handover component 170 may be performed by transceiver 702.

Also, memory 716 may be configured to store data used herein and/or local versions of applications 775 or the handover component 170 and/or one or more of the subcomponents being executed by at least one processor 712. Memory 716 can include any type of computer-readable medium usable by a computer or at least one processor 712, such as random access memory (RAM), read only memory (ROM), tapes, magnetic discs, optical discs, volatile memory, non-volatile memory, and any combination thereof. In an aspect, for example, memory 716 may be a non-transitory computer-readable storage medium that stores one or more computer-executable codes defining the handover component 170 and/or one or more of the subcomponents, and/or data associated therewith, when BS 105 is operating at least one processor 712 to execute the handover component 170 and/or one or more of the subcomponents.

Transceiver 702 may include at least one receiver 606 and at least one transmitter 708. Receiver 706 may include hardware, firmware, and/or software code executable by a processor for receiving data, the code comprising instructions and being stored in a memory (e.g., computer-readable medium). Receiver 706 may be, for example, a radio frequency (RF) receiver. In an aspect, receiver 706 may receive signals transmitted by at least one base station 105. Additionally, receiver 706 may process such received signals, and also may obtain measurements of the signals, such as, but not limited to, Ec/Io, SNR, RSRP, RSSI, etc. Transmitter 708 may include hardware, firmware, and/or software code executable by a processor for transmitting data, the code comprising instructions and being stored in a memory (e.g., computer-readable medium). A suitable example of transmitter 708 may including, but is not limited to, an RF transmitter.

Moreover, in an aspect, BS 105 may include RF front end 788, which may operate in communication with one or more antennas 765 and transceiver 702 for receiving and transmitting radio transmissions, for example, wireless communications transmitted by the UE 110. RF front end 788 may be connected to one or more antennas 765 and can include one or more low-noise amplifiers (LNAs) 790, one or more switches 7692, one or more power amplifiers (PAs) 798, and one or more filters 7696 for transmitting and receiving RF signals.

In an aspect, LNA 790 can amplify a received signal at a desired output level. In an aspect, each LNA 790 may have a specified minimum and maximum gain values. In an aspect, RF front end 788 may use one or more switches 792 to select a particular LNA 790 and a specified gain value based on a desired gain value for a particular application.

Further, for example, one or more PA(s) 7698 may be used by RF front end 788 to amplify a signal for an RF output at a desired output power level. In an aspect, each PA 798 may have specified minimum and maximum gain values. In an aspect, RF front end 788 may use one or more switches 792 to select a particular PA 798 and the specified gain value based on a desired gain value for a particular application.

Also, for example, one or more filters 796 can be used by RF front end 788 to filter a received signal to obtain an input RF signal. Similarly, in an aspect, for example, a respective filter 796 can be used to filter an output from a respective PA 798 to produce an output signal for transmission. In an aspect, each filter 796 can be connected to a specific LNA 790 and/or PA 798. In an aspect, RF front end 788 can use one or more switches 792 to select a transmit or receive path using a specified filter 796, LNA 790, and/or PA 798, based on a configuration as specified by transceiver 702 and/or processor 712.

As such, transceiver 702 may be configured to transmit and receive wireless signals through one or more antennas 765 via RF front end 788. In an aspect, transceiver may be tuned to operate at specified frequencies such that BS 105 can communicate with, for example, the UE 110. In an aspect, for example, modem 160 can configure transceiver 702 to operate at a specified frequency and power level based on the BS configuration of the BS 105 and the communication protocol used by modem 1640.

In an aspect, modem 160 can be a multiband-multimode modem, which can process digital data and communicate with transceiver 702 such that the digital data is sent and received using transceiver 702. In an aspect, modem 160 can be multiband and be configured to support multiple frequency bands for a specific communications protocol. In an aspect, modem 160 can be multimode and be configured to support multiple operating networks and communications protocols. In an aspect, modem 160 can control one or more components of BS 105 (e.g., RF front end 788, transceiver 702) to enable transmission and/or reception of signals from the network based on a specified modem configuration. In an aspect, the modem configuration can be based on the mode of the modem and the frequency band in use.

Figure 8:
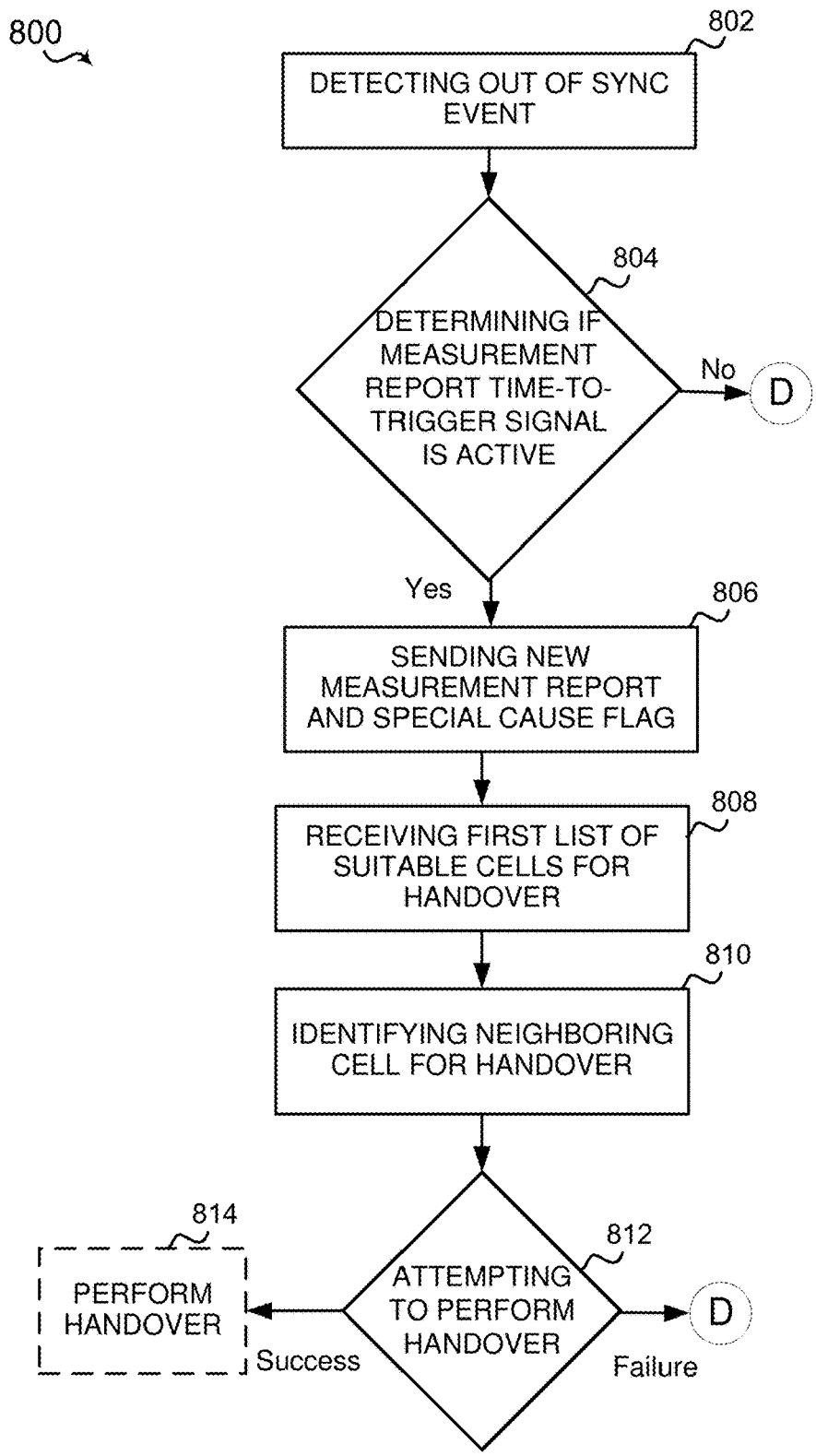
FIG. 8 is an example of a handover method performed by a UE.

Turning to FIG. 8, at block (802), the UE 110 detects an out of sync event while being connected to a current cell. At block (804), the UE 110 determines if a measurement report time-to-trigger signal is active. If the measurement report time-to-trigger signal is active, the UE 110 sends (806) a first new measurement report and a first special cause flag prior to a next scheduled measurement report to the communication network in response to the detection of the out of sync event. At block (808) the UE 110 receives a first list of one or more neighboring cells suitable for a handover. At block (810) the UE 110 identifies a first neighboring cell from the list of the one or more neighboring cells for the handover. At block (812) the UE 110 attempts to perform the handover from the current cell to the first neighboring cell. If successful, the UE 110 may optionally perform (814) the handover.

Figure 9:
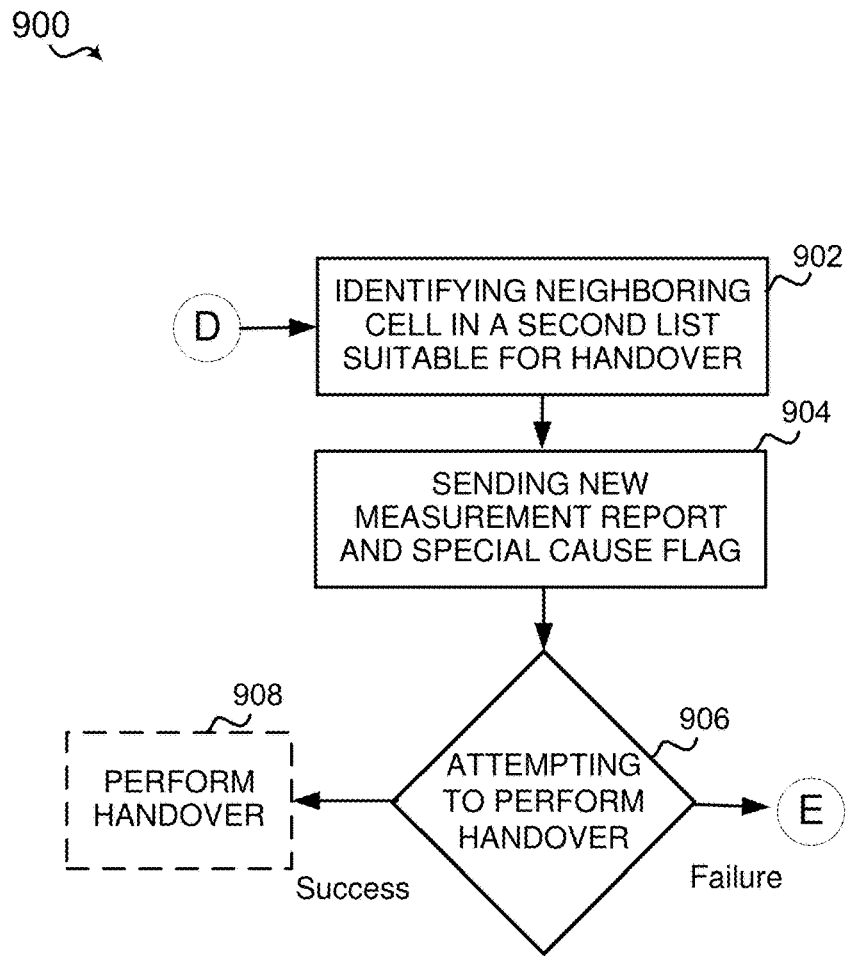
FIG. 9 is a continuation of the handover method of FIG. 8.

Turning to FIG. 9, if the measurement report time-to-trigger signal does not exist or the UE 110 fails to perform the handover at block (812), the UE 110 identifies (902) a second neighboring cell from a second list of one or more neighboring cells suitable for the handover. At block (904), the UE 110 sends a second new measurement report and a second special cause flag to the communication network. In some implementations, the second special cause flag may be identical to the first special cause flag in step (806). At block (906), the UE 110 attempts to perform the handover from the current cell to the second neighboring cell. If successful, the UE 110 may optionally perform (908) the handover.

Figure 10:
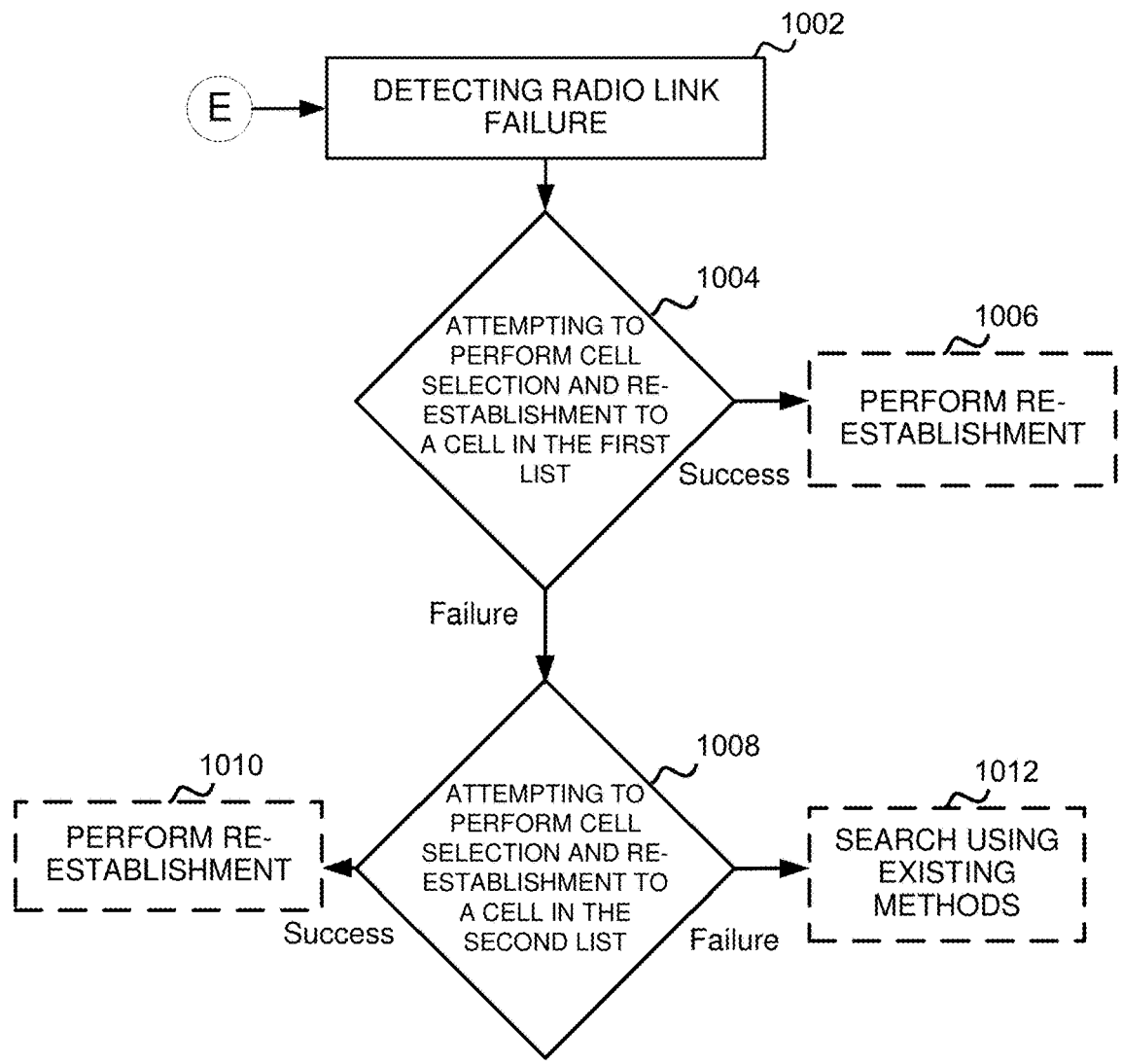
FIG. 10 is a continuation of the handover method of FIG. 9.

Referring now to FIG. 10, if the UE 110 fails to perform the handover at block (906), the UE 110 may detect (1002) a radio link failure. Next, the UE 110 may attempt (1004) to perform a cell selection and re-establishment from the current cell to the one or more neighboring cells in the first list. If successful, the UE 110 may optionally perform (1006) the re-establishment. If the UE 110 fails to complete the re-establishment at block (1004), the UE 110 may attempt to perform (1008) the cell selection and re-establishment from the current cell to the one or more neighboring cells in the second list. If successful, the UE 110 may optionally perform (1010) the re-establishment. If the UE 110 fails to complete the re-establishment at block (1008), the UE 110 may search suitable cells using existing methods.

Figure 11:
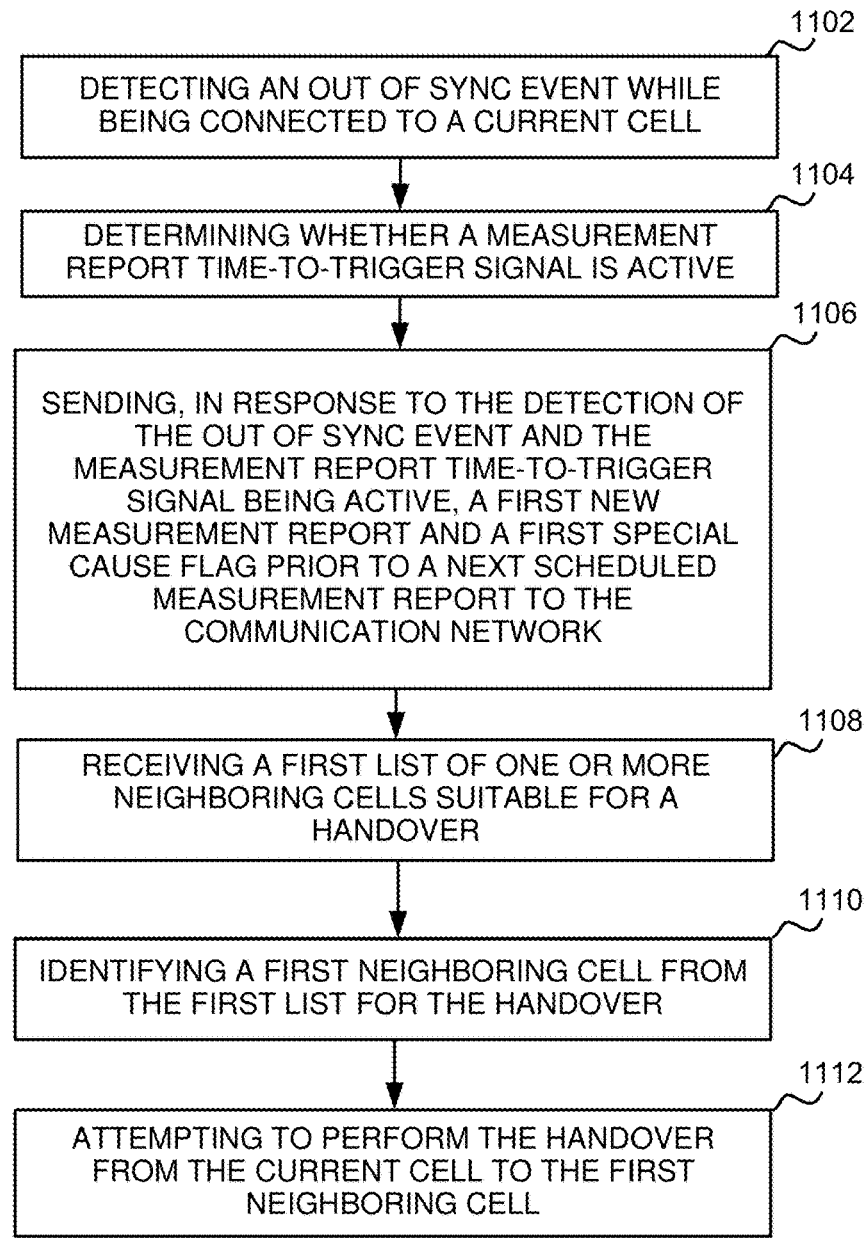
FIG. 11 is an example of a handover method after receiving a list of neighboring cells suitable for handover.

Referring to FIG. 11, an example of a method 1100 performs a handover from an existing cell to a neighboring cell chosen from a list of suitable neighboring cells. The selection may allow the UE 110 to perform a fast handover during an out of sync event and/or a RLF event.

At block 1102, the method 1100 may include detecting an out of sync event while being connected to a current cell. For example, the detection component 154 of the UE 110 may detect an out of sync event while connected to the base station 105a.

At block 1104, the method 1100 may include determining whether a measurement report time-to-trigger signal is active. For example, the MR component 152 of the UE 110 may report a time-to-trigger signal is active.

At block 1106, the method 1100 may include sending, in response to the detection of the out of sync event and the measurement report time-to-trigger signal being active, a first new measurement report and a first special cause flag prior to a next scheduled measurement report to the communication network. For example, after the detection of the out of sync event and the measurement report time-to-trigger signal being active, the communication component 156 may send a new measurement report and a special cause flag to the base station 105a. The transmission of the new measurement report may occur before the next scheduled measurement report transmission. The new measurement report may allow the UE 110 to alert the base station 105a about an out of sync event. The alert may provide the base station 105a an opportunity to arrange a handover for the UE 110 prior to a RLF event.

At block 1108, the method 1100 may include receiving a first list of one or more neighboring cells suitable for a handover. For example, the communication component 156 may receive a list of suitable neighboring cells for a handover.

At block 1110, the method 1100 may include identifying a first neighboring cell from the first list for the handover. For example, the handover component 150 may identify the base station 105b as a suitable neighboring cell for the handover process.

At block 1112, the method 1100 may include attempting to perform the handover from the current cell to the first neighboring cell. For example, the handover component 150 may try to perform the handover from the base station 105a to the base station 105b.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of performing a handover in a communication network, comprising:
    periodically sending a group of measurement reports to the communication network prior to detecting an out of sync event;
    detecting the out of sync event while being connected to a current cell;
    determining whether a measurement report time-to-trigger signal is active;
    sending, in response to the detection of the out of sync event and the measurement report time-to-trigger signal being active, a first new measurement report and a first special cause flag prior to a next scheduled measurement report to the communication network;
    receiving a first list of one or more neighboring cells suitable for a handover;
    identifying a first neighboring cell from the first list for the handover; and
    attempting to perform the handover from the current cell to the first neighboring cell.

2. The method of claim 1, further comprising:
    identifying, in response to the measurement report time-to-trigger signal not being active, a second neighboring cell from a second list of one or more neighboring cells suitable for the handover;
    sending a second new measurement report and a second special cause flag to the communication network; and
    attempting to perform the handover from the current cell to the second neighboring cell.

3. The method of claim 2, wherein the first special cause flag and the second special cause flag are identical.

4. The method of claim 2, further comprising:
    detecting a radio link failure;
    attempting, in response to failing to perform the handover from the current cell to the first and second neighboring cells, to perform a re-establishment from the current cell to the one or more neighboring cells in the first list; and
    attempting, in response to failing to complete the re-establishment from the current cell to the one or more neighboring cells in the first list, to perform the re-establishment from the current cell to the one or more neighboring cells in the second list.

5. The method of claim 4, wherein the first and second special cause flags each includes at least one of an out of sync signal, a radio link failure signal, a low serving cell power signal, a fast drop in serving cell power signal, a low UL grant signal, or a low channel quality indicator signal.

6. The method of claim 1, further comprising:
    identifying, in response to failing to perform the handover from the current cell to the first neighboring cell, a second neighboring cell from a second list of one or more neighboring cells suitable for the handover;
    sending a second new measurement report and a second special cause flag to the communication network; and
    attempting to perform the handover from the current cell to the second neighboring cell.

7. The method of claim 6, further comprising:
    detecting a radio link failure;
    attempting, in response to failing to perform the handover from the current cell to the first and second neighboring cells, to perform a re-establishment from the current cell to the one or more neighboring cells in the first list; and
    attempting, in response to failing to complete the re-establishment from the current cell to the one or more neighboring cells in the first list, to perform the re-establishment from the current cell to the one or more neighboring cells in the second list.

8. The method of claim 1, further comprising analyzing at least one of intra-frequency measurements, inter-frequency measurements, and inter-radio access technology measurements prior to attempting to perform the handover from the current cell to the first neighboring cell.

9. The method of claim 1, further comprising:
    waiting, after detecting the out of sync event, for a duration of the out of sync event to exceed a threshold before determining whether the measurement report time-to-trigger signal is active.

10. The method of claim 9, wherein sending first new measurement report and the first special cause flag occurs after waiting for the duration of the out of sync event to exceed the threshold.

11. A user equipment for performing a handover in a communication network, comprising:
    a memory;
    a transceiver; and
    one or more processors operatively coupled with the memory and the transceiver, the one or more processors configured to perform the functions of:
    periodically sending, via the transceiver, a group of measurement reports to the communication network prior to detecting the out of sync event;
    detecting the out of sync event while being connected to a current cell;

determining whether a measurement report time-to-trigger signal is active;
sending, via the transceiver, in response to the detection of the out of sync event and the measurement report time-to-trigger signal being active, a first new measurement report and a first special cause flag prior to a next scheduled measurement report to the communication network;
receiving, via the transceiver, a first list of one or more neighboring cells suitable for a handover;
identifying a first neighboring cell from the first list for the handover; and
attempting to perform the handover from the current cell to the first neighboring cell.

12. The user equipment of claim 11, wherein the one or more processors are further configured to perform the functions of:
identifying, in response to the measurement report time-to-trigger signal not being active, a second neighboring cell from a second list of one or more neighboring cells suitable for the handover;
sending, via the transceiver, a second new measurement report and a second special cause flag to the communication network; and
attempting to perform the handover from the current cell to the second neighboring cell.

13. The user equipment of claim 12, wherein the first special cause flag and the second special cause flag are identical.

14. The user equipment of claim 12, wherein the one or more processors are further configured to perform the functions of:
detecting a radio link failure;
attempting, in response to failing to perform the handover from the current cell to the first and second neighboring cells, to perform a re-establishment from the current cell to the one or more neighboring cells in the first list; and
attempting, in response to failing to complete the re-establishment from the current cell to the one or more neighboring cells in the first list, to perform the re-establishment from the current cell to the one or more neighboring cells in the second list.

15. The user equipment of claim 14, wherein the first and second special cause flags each includes at least one of an out of sync signal, a radio link failure signal, a low serving cell power signal, a fast drop in serving cell power signal, a low UL grant signal, or a low channel quality indicator signal.

16. The user equipment of claim 11, wherein the one or more processors are further configured to perform the functions of:
identifying, in response to failing to perform the handover from the current cell to the first neighboring cell, a second neighboring cell from a second list of one or more neighboring cells suitable for the handover;
sending a second new measurement report and a second special cause flag to the communication network; and
attempting to perform the handover from the current cell to the second neighboring cell.

17. The user equipment of claim 16, wherein the one or more processors are further configured to perform the functions of:
detecting a radio link failure;
attempting, in response to failing to perform the handover from the current cell to the first and second neighboring cells, to perform a re-establishment from the current cell to the one or more neighboring cells in the first list; and
attempting, in response to failing to perform the re-establishment from the current cell to the one or more neighboring cells in the first list, to perform the re-establishment from the current cell to the one or more neighboring cells in the second list.

18. The user equipment of claim 11, wherein the one or more processors are further configured to perform the functions of analyzing at least one of intra-frequency measurements, inter-frequency measurements, and inter-radio access technology measurements prior to attempting to perform the handover from the current cell to the first neighboring cell.

19. The user equipment of claim 11, wherein the one or more processors are further configured to perform the functions of waiting, after detecting the out of sync event, for a duration of the out of sync event to exceed a threshold before determining whether the measurement report time-to-trigger signal is active.

20. The user equipment of claim 19, wherein sending first new measurement report and the first special cause flag occurs after waiting for the duration of the out of sync event to exceed the threshold.

21. A non-transitory computer-readable medium having instructions stored therein that, when executed by one or more processors, cause the one or more processors to:
periodically send a group of measurement reports to the communication network prior to detecting an out of sync event;
detect the out of sync event while being connected to a current cell;
determine whether a measurement report time-to-trigger signal is active;
send, in response to the detection of the out of sync event and the measurement report time-to-trigger signal being active, a first new measurement report and a first special cause flag prior to a next scheduled measurement report to the communication network;
receive a first list of one or more neighboring cells suitable for a handover;
identify a first neighboring cell from the first list for the handover; and
attempt to perform the handover from the current cell to the first neighboring cell.

22. The non-transitory computer readable medium of claim 21, further comprises instructions that, when executed by the one or more processors, cause the one or more processors to:
identify, in response to the measurement report time-to-trigger signal not being active, a second neighboring cell from a second list of one or more neighboring cells suitable for the handover;
send a second new measurement report and a second special cause flag to the communication network; and
attempt to perform the handover from the current cell to the second neighboring cell.

23. The non-transitory computer readable medium of claim 22, wherein the first special cause flag and the second special cause flag are identical.

24. The non-transitory computer readable medium of claim 22, further comprises instructions that, when executed by the one or more processors, cause the one or more processors to:
detect a radio link failure;
attempt, in response to failing to perform the handover from the current cell to the first and second neighboring cells, to perform a re-establishment from the current cell to the one or more neighboring cells in the first list; and attempt, in response to failing to complete the re-establishment from the current cell to the one or more neighboring cells in the first list, to perform the re-establishment from the current cell to the one or more neighboring cells in the second list.

25. The non-transitory computer readable medium of claim 24, wherein the first and second special cause flags each includes at least one of an out of sync signal, a radio link failure signal, a low serving cell power signal, a fast drop in serving cell power signal, a low UL grant signal, or a low channel quality indicator signal.

26. The non-transitory computer readable medium of claim 21, further comprises instructions that, when executed by the one or more processors, cause the one or more processors to:

identify, in response to failing to perform the handover from the current cell to the first neighboring cell, a second neighboring cell from a second list of one or more neighboring cells suitable for the handover;

send a second new measurement report and a second special cause flag to the communication network; and attempt to perform the handover from the current cell to the second neighboring cell.

27. The non-transitory computer readable medium of claim 26, further comprises instructions that, when executed by the one or more processors, cause the one or more processors to:

detect a radio link failure;

attempt, in response to failing to perform the handover from the current cell to the first and second neighboring cells, to perform a re-establishment from the current cell to the one or more neighboring cells in the first list; and attempt, in response to failing to perform the re-establishment from the current cell to the one or more neighboring cells in the first list, to perform the re-establishment from the current cell to the one or more neighboring cells in the second list.

28. The non-transitory computer readable medium of claim 21, further comprises instructions that, when executed by the one or more processors, cause the one or more processors to analyze at least one of intra-frequency measurements, inter-frequency measurements, and inter-radio access technology measurements prior to attempting to perform the handover from the current cell to the first neighboring cell.

29. The non-transitory computer readable medium of claim 21, further comprises instructions that, when executed by the one or more processors, cause the one or more processors to wait, after detecting the out of sync event, for a duration of the out of sync event to exceed a threshold before determining whether the measurement report time-to-trigger signal is active.

30. The non-transitory computer readable medium of claim 29, wherein sending first new measurement report and the first special cause flag occurs after waiting for the duration of the out of sync event to exceed the threshold.

* * * * *